3,600,466
PROCESS FOR THE PREPARATION OF PURE-
WHITE POLYSTYRENE COMPOSITIONS
Eichi Moriguchi, Takeshi Goto, Michikazu Hiraoka,
Teruhisa Mitsumori, and Shonosuke Rokudo, Tokyo,
Japan, assignors to Denki Kagaku Kogyo Kabushiki
Kaisha, Tokyo, Japan
No Drawing. Filed June 16, 1967, Ser. No. 646,477
Int. Cl. C08f 1/04, 1/11; C08d 15/04
U.S. Cl. 260—880
3 Claims

ABSTRACT OF THE DISCLOSURE

Pure-white polystyrene compositions having high impact resistance and good heat resistance are prepared by a two step graft polymerization, that is, by conducting a bulk polymerization of a mixture of a styrene monomer and polybutadiene at 80–120° C., with the conversion ratio of 20–40% of the styrene monomer with the addition of, if necessary, less than 0.2% by weight of dicumyl peroxide, conducting a suspension polymerization of the product, after mixing the product with an aqueous solution of a dispersing agent, at 105–125° C., with the addition of dicumyl peroxide, in an amount such that the total amount of the catalyst is 0.05–0.5% by weight until the conversion ratio reaches more than 70%, and then conducting further polymerization at 125–140° C. The uniformity of the product beads can be further improved by using as the dispersing agent a partially saponified vinyl acetate-dodecylvinyl ether copolymer.

BACKGROUND OF THE INVENTION

(1) Field of the invention

The present invention relates to a process for the preparation of polystyrene compositions having a high impact resistance and more particularly to a process for the preparation of high yields of pure-white polystyrene compositions having high impact resistance and good heat stability.

(2) Description of the prior art

Polystyrene is widely used in molding compositions in general, but its largest fault is that it has low impact resistance. In order to improve the impact resistance, there have frequently been employed graft polymerizations in which a mixture of rubbery materials and a styrene monomer is polymerized.

In processes for the graft polymerization of styrene and rubbery materials, there are three main types, namely, (1) bulk polymerization, (2) a suspension polymerization, and (3) a two-step polymerization of bulk and suspension polymerizations. Considered from an economical viewpoint, an operational viewpoint, and with reference to the quality of the products, the most excellent process is the so-called bulk-suspension, two-step polymerization in which a bulk polymerization is conducted in the first half of the polymerization process and, after the system has reached a proper conversion ratio, the latter half of the polymerization is conducted by suspension polymerization. As polymerization catalysts used in the two-step polymerization process, there may be illustrated organic peroxides soluble in a styrene monomer, such as, those used in the polymerization of styrene alone, and shown in the following table.

TABLE 1
[Styrene polymerization catalyst]

| Catalyst | Ten-hour half-life temp. (° C.) | Critical temp. (° C.) | Activation energy (kcal./mol) |
|---|---|---|---|
| Di-tertiary-butyl peroxide | 124 | 100 | 35.1 |
| Tertiary-butyl perbenzoate | 105 | 90 | 34.7 |
| Tertiary-butyl perphthalate | 102 | 95 | 37.7 |
| Benzoyl peroxide | 72 | 70 | 30.0 |
| Lauroyl peroxide | 61 | 64 | 30.7 |

In the above table, the term "ten-hour half-life temperature" means a temperature at which ten hours is required to reduce the amount of the active oxygen of the catalyst to ½ of the initial amount, when 2–3 mol percent of the catalyst is dissolved in benzene, the solution is sealed in a tube in which the inside atmosphere has been replaced with a nitrogen gas, and the tube is placed in a thermostatic vessel at the constant temperature.

By conducting the two-step graft polymerization of styrene and rubbery materials, using as the polymerization catalyst the organic peroxides shown in Table 1, a granular polystyrene composition is prepared. But in the case of using one or more catalysts having a "ten-hour half-life temperature" below 110° C., or capable of being decomposed at a comparatively low temperature, the impact resistance of products thus obtained is insufficient. In order to increase the impact resistance a long and uneconomical polymerization time-temperature cycle is necessary. Further, in the case of using a catalyst having a high "ten-hour half-life temperature," such as, ditertiary-butyl peroxide or a mixture of the said catalyst and a catalyst having a low "ten-hour half-life temperature," a polymer having a comparatively high impact resistance can be produced by applying an economical polymerization time-temperature cycle, but the color and the heat stability of the products formed from the polymer are inferior. This lowers the quality of the products. Also, in this polymerization process (particularly in a suspension process) a large amount of minute particles (e.g., passing through 100 mesh sieve-ASTM) are formed. This reduces the yield and also makes the washing of the polymer beads difficult. Further, it raises problems of treating the waste mother liquor.

Various attempts have hitherto been made to overcome these faults. For example, there has been provided a process in which the gloss of the product is improved by employing a specific polymerization system for controlling the speed of stirring during the polymerization. See Japanese patent publication 17,062/'64. A process in which the heat stability of products is improved by reducing the proportion of residual monomer by employing a combination of specific polymerization catalysts has also been disclosed in Japanese patent publications 5644/'54 and 5,391/'61. A process in which the washability of products is improved and the yield of the polymer is increased by adding inorganic salts in suspension polymerization to control the formation of said minute particles is disclosed in Japanese patent publications 7,895/'54 and 22,077/'65. However, by various experiments the inventors have found that, although such processes may improve other properties of the products, pure-white polymer beads having a uniform grain size cannot be prepared by such known processes.

Therefore, an object of the present invention is to provide a process for preparing pure-white polystyrene compositions having a high impact resistance without accompanied with the above-mentioned faults. Other objects and the advantages of the present invention will become apparent from the following descriptions.

SUMMARY OF THE INVENTION

According to the process of this invention, pure-white polystyrene compositions having a high impact resistance and good heat stability are obtained with a high yield while controlling the formation of minute particles at the suspension polymerization. That is, a mixture of 85 to 98 parts by weight of a styrene monomer and 15 to 2 parts by weight of polybutadiene is mixed, if necessary, with a chain transfer agent, a plasticizer and, if a catalyst is to be used at this stage, less than 0.2% by weight based on the above-mentioned raw materials of dicumyl peroxide as a polymerization catalyst; the mixture is polymerized next by a bulk polymerization at a temperature of from 80 to 120° C., until the conversion ratio of the styrene monomer into polymer reaches 20 to 40%; the said partially polymerized mixture thus polymerized is then dispersed in an aqueous medium containing a dispersing agent; dicumyl peroxide is added into the suspension in an amount such that the total amount of the catalyst is from about 0.05 to 0.5% by weight based on the amount of the said raw materials; the system is subjected to suspension polymerization at a temperature of from 105 to 125° C., until the conversion ratio of the styrene monomer into polymer reaches at least 70%; thereafter the polymerization is continued at a temperature of from 125 to 140° C., whereby the polymerization is substantially finished; and finally the product is washed and dried to provide polymer beads.

As mentioned above, the process of this invention is a bulk-suspension two-step polymerization. In the bulk polymerization the catalyst is not necessarily used to achieve the purpose of the polymerization, but it is desirable to use a small amount of the catalyst in cases requiring the reduction of the polymerization period. However, it has been found that in this case the use of the catalysts shown in Table 1 must be avoided and the use of dicumyl peroxide is necessary. That is, if any catalysts other than dicumyl peroxide are used, it is impossible to produce the pure-white polymer.

A part of the catalyst added to the bulk polymerization step is decomposed but the remaining part thereof is carried over into the subsequent suspension polymerization step. It is also necessary in the suspension polymerization step to add a polymerization catalyst, and the catalyst must be dicumyl peroxide to achieve the objects of this invention. If a catalyst other than dicumyl peroxide is used in the suspension polymerization or organic peroxides other than dicumyl peroxide are present in the suspension polymerization system together with dicumyl peroxide, pure-white polymers cannot be obtained, the color tone and heat stability of the products are reduced, and a large amount of minute particles is formed in the suspension polymerization, which makes the attainment of the objects of this invention impossible.

The amount of dicumyl peroxide catalyst to be used, if any, in the first bulk polymerization of this invention is less than 0.2% by weight based on the raw materials and if the addition amount of the catalyst is higher than the limit, the polymerization proceeds excessively, which makes the operation unstable. In the subsequent suspension polymerization of this invention, the catalyst is so added that the total amount of the catalyst, that is, the sum of the freshly added catalyst and the catalyst, if employed, in the bulk polymerization becomes from 0.05 to 0.5% by weight, based on the raw materials. If the addition amount of the catalyst is less than 0.05% by weight, the rate of polymerization is reduced and also the proportion of residual monomer becomes large, while if the amount is higher than 0.5% by weight, the reaction proceeds suddenly, raising the danger of explosion.

The "ten-hour half-life temperature" of dicumyl peroxide is 117° C., which is lower than that of di-tertiary-butyl peroxide as shown in Table 1. As mentioned above, since a pure-white polymer cannot be obtained in the case of using di-tertiary-butyl peroxide, it is not considered to be an important factor for attaining the objects of this invention to employ a catalyst having high "ten-hour half-life temperature." The reason that dicumyl peroxide has the property of attaining the objects of this invention, as opposed to di-tertiary-butyl peroxide, may perhaps be caused by differences in activation energy, critical temperature and molecular structure. The activation energy and the critical temperature of dicumyl peroxide are 40.6 Kcal./mol and 120° C., respectively and they are higher than those of general organic peroxides that have been used in the polymerization of styrene.

The temperature of the bulk polymerization is preferably from 80 to 120° C. If the temperature is lower than 80° C., a considerably longer period of polymerization is necessary, which makes the process uneconomical, while, if the temperature is higher than 200° C., the polymerization proceeds quickly, which makes control of the temperature difficult. The conversion ratio in the bulk polymerization shall be from 20 to 40% and, if the conversion ratio is less than 20%, the color tone, the gloss, and the texture of the products is unsatisfactory. If it is higher than 40%, the viscosity of the reaction system is too high, making the operation difficult, and also reducing the impact resistance of the product as the case may be.

As the dispersing agent to be added into the aqueous medium in the suspension polymerization there may be used organic high molecular compounds used in a general suspension polymerization of a vinyl monomer. That is, there are illustrated a partially saponified polyvinyl acetate (polyvinyl alcohol), polyalkylene oxides (e.g., polyethylene oxide, polypropylene oxide, etc.), a partially saponified vinyl acetate-maleic anhydride copolymer, a partially formalized polyvinyl alcohol, a partially butyralized polyvinyl alcohol, and gelatin. They may be used alone or a mixture thereof or may be used together with other surface active agent.

The inventors have further found that although the objects of this invention can be attained by using the above said general dispersing agents, the more marked merits can be obtained by using a specific dispersing agent in the above-mentioned process. That is, the preferred specific dispersing agent is the partially saponified vinyl acetate-alkylvinyl ether copolymer in which the carbon number of said alkyl group is higher than 12, the copolymerization ratio of the alkyl vinyl ether is from 0.2 to 1.0 mol percent, and the hydrolysis degree is higher than 80%, as in the case of polyvinyl alcohol which is used usually as a dispersing agent.

It has been found that when the suspension polymerization of the partially polymerized product is conducted by using the specific dispersing agent, the dispersion is maintained in a uniform and stable condition at a high temperature and the formation of minute particles is remarkably reduced, which improves the yield of the product. The grain sizes of the polymer beads thus obtained are quite uniform as compared with the case of using a conventional dispersing agent.

In addition, the preferred rubbery materials for use in the process of this invention are solution polymerized polybutadiene and any types of high cis type, low cis type, cis-trans type, etc., may be employed.

The invention will now be explained referring to the following examples. In the examples, parts are by weight.

EXAMPLE 1

Into a reaction vessel there were charged as the raw materials 95.5 parts of a styrene monomer and 4.5 parts of polybutadiene (cis-1.4 units 36%) and then after the additions of 0.1 part of tertiary-dodecyl mercaptan and 3.0 parts of a refined hydrocarbon oil, the system was stirred while heating to 100° C. When the conversion ratio reached 24.5%, the reaction mixture was cooled to stop the reaction.

Thereafter, 0.2 part of dicumyl peroxide was added in the reaction mixture as a catalyst and the resulting mixture was dispersed with stirring in 200 parts of an aqueous medium containing 0.16 part of the partially saponified polyvinyl acetate (polymerization degree 2400, hydrolysis degree 88%) as a dispersing agent. The system was polymerized at a temperature of 115° C., until the conversion ratio reached 75% and thereafter the temperature was increased further to 130° C., to complete the polymerization substantially.

After the end of the reaction, the slurry thus prepared was filtered off, washed and dried to provide the polystyrene beads, so the proportion of minute particles left in the mother liquor was very slight, the said slurry was easily filtered and washed. The amounts of the residual monomer and the minute particles were measured. Also, the various properties of a sample formed by injection molding from pellets prepared in a conventional manner were measured. The results are shown in Table 2. The same measurements were also conducted in the following examples and comparative examples and the results are also shown in the same table.

EXAMPLE 2

For obtaining a polymer having a very high impact resistance, the same procedure as in Example 1 was repeated using a raw material of 88 parts of a styrene monomer and 12 parts of polybutadiene, in which, however, the bulk polymerization was stopped when the polymerization ratio reached 21.8%.

EXAMPLE 3

The same procedure as in Example 1 was repeated except that the bulk conversion ratio was 35.5%.

EXAMPLE 4

The same procedure as in Example 1 was repeated, but 0.04 part of dicumyl peroxide was added to the bulk polymerization batch and 0.03 part of the catalyst was added to the suspension polymerization.

EXAMPLE 5

The same procedure as in Example 1 was repeated in which however, 0.4 part of dicumyl peroxide was added to the suspension polymerization.

EXAMPLE 6

The same procedure as in Example 1 was repeated. However, the initial reaction temperature and the conversion ratio of the suspension polymerization were 120° C. and 80% respectively and the final reaction temperature was 140° C.

EXAMPLE 7

A partially saponified vinyl acetate-alkylvinyl ether copolymer which is one of the specific preferred dispersing agents used in the process of this invention was prepared by the following method:

A solution consisting of 100 parts of vinyl acetate, 0.8 part of dodecylvinyl ether and 25 parts of methanol was subjected to solution polymerization for 12 hours at a temperature of 65° C., with the addition of 0.05 part of azobia-isobutylonitrile to provide a vinyl acetate-dodecyl vinyl ether copolymer with 99% yield. A saponification reaction was carried out at a temperature of 40° C., for a saponification bath consisting of 30 parts of the said copolymer thus obtained and 70 parts of methanol with the addition of 1/60 equivalent of sodium methylate to the vinyl acetate in the copolymer to provide a partially saponified product of the said copolymer having a 98% hydrolysis degree and 1700 in average polymerization degree.

In a proper reaction vessel were charged 95.5 parts of a styrene monomer and 4.5 parts of polybutadiene (cis 1:4 unit 36%), then the mixture was combined with 0.1 part of dodecyl mercaptan and 4.0 parts of a refined hydrocarbon oil. After the inside atmosphere in the reaction vessel was replaced with nitrogen gas, 0.05 part of dicumyl peroxide was added to the system and the system was heated to 100° C. with stirring. When the conversion ratio reached 25.0%, the reaction mixture was cooled to stop the reaction.

Thereafter, the above-mentioned reaction mixture was combined with stirring with 200 parts of an aqueous medium containing 0.16 part of the partially saponified vinyl acetate-dodecylvinyl ether copolymer, and, after replacing the inside atmosphere of the reaction vessel with nitrogen gas, the polymerization was conducted at a temperature of 115° C. with the addition of 0.2 part of dicumyl peroxide until the conversion ratio reached 75%. Then the reaction was further continued at a temperature of 130° C. substantially to complete the polymerization.

After the end of the reaction, the slurry was filtered off and washed and dried to provide the polystyrene beads. The mother liquor contained a very small amount of minute particles, which could be easily recovered, filtered and washed. The grain size distribution of the beads thus obtained was as follows:

About 1% had a grain size of above 10 mesh, about 95% had a grain size of from 10 to 40 mesh, and about 4% had a grain size of below 40 mesh. This may be compared with the grain size distribution of beads prepared under the same conditions in which polyvinyl alcohol was used as the dispersing agent, and in which the grain size distribution was as follows:

|  | Percent |
|---|---|
| Above 10 mesh | 15 |
| From 10 to 40 mesh | 75 |
| Below 40 mesh | 10 |

The results show that the uniformity of grain size of polymer beads prepared by using the specific dispersing agent was excellent.

EXAMPLE 8

The same procedure as in Example 7 was repeated by using, as the specific dispersing agent, a partially saponified vinyl acetate-hexadecylvinyl ether copolymer (hydrolysis degree 98%, average polymerization degree 1700) and the grain size distribution of the beads thus obtained was almost the same as in Example 7.

COMPARATIVE EXAMPLE 1

The same procedure as in Example 1 was repeated in which, however, the bulk conversion ratio was 42.1% which is beyond the condition of this invention.

COMPARATIVE EXAMPLE 2

The same procedure as in Example 1 was repeated in which, however, the amount of the catalyst added to the suspension polymerization was 0.03 part which is less than the range of this invention.

COMPARATIVE EXAMPLE 3

The same procedure as in Example 1 was repeated in which, however, the first reaction temperature in the suspension polymerization and the final reaction temperature thereof were 105° C. and 120° C. respectively which are lower than those defined by the process of this invention.

COMPARATIVE EXAMPLES 4–8

The same procedure as in Example 1 was repeated using organic peroxides other than dicumyl peroxide, or using mixtures thereof with dicumyl peroxide, as the catalyst for the suspension polymerization.

In addition, in Table 2, the impact resistance was measured by the method of ASTM D 256-56 (ft. lbs./in. notch), the amount of residual monomer was measured by an ultraviolet absorption method (percent by weight), the amount of minute particles was measured with regard to the particles passed through a 100 mesh sieve—ASTM (percent by weight), and the heat stability was judged by standing the samples in an oven for 12 hours at 120° C.

As is clear from Table 2, the color tone of the products obtained by Examples 1 to 6 of the process of this invention was pure white, the heat stability and impact resistance were good and the amount of residual monomer and the amount of minute particles, all were much better for the products of this invention than for those prepared by other processes.

(c) adding dicumyl peroxide as the polymerization the catalyst in the system is from about 0.05 to 0.5% catalyst in an amount such that the total amount of by weight to the weight of the raw material mixture, (d) subjecting the resulting mixture to a suspension polymerization at a temperature of from 105° C. to 125° C., until the conversion ratio reaches at least 70%;

(e) continuing the reaction while increasing the reaction temperature to from 125° C. to 140° C., thereby substantially completing the polymerization; and (f) recovering the pure-white polystyrene composition product.

2. The process of claim 1 further comprising adding less than 0.2% by weight of the raw material mixture of

TABLE 2

| | Bulk conversion ratio, percent | Suspension polymerization | | Catalyst/ percent | Impact resistance (ft. lbs./in. notch) | Residual monomer, percent | Minute particles, percent | Color tone | Heat stability |
|---|---|---|---|---|---|---|---|---|---|
| | | ° C. Percent | ° C. | | | | | | |
| Example No.: | | | | | | | | | |
| 1 | 24.5 | 115   75 | 130 | DC/0.2 | 1.58 | 0.06 | 0.15 | Pure white | White. |
| 2 | 21.8 | 115   75 | 130 | DC/0.2 | 2.95 | 0.08 | 0.20 | ....do.... | Do. |
| 3 | 25.5 | 115   75 | 130 | DC/0.2 | 1.44 | 0.04 | 0.13 | ....do.... | Do. |
| 4 | 24.5 | 115   75 | 130 | DC/0.7 | 1.49 | 0.09 | 0.20 | ....do.... | Do. |
| 5 | 24.5 | 115   75 | 130 | DC/0.4 | 1.55 | 0.01 | 0.16 | ....do.... | Do. |
| 6 | 24.5 | 120   80 | 140 | DC/0.2 | 1.53 | 0.05 | 0.13 | ....do.... | Do. |
| 7 | 25.0 | 115   75 | 130 | DC/0.25 | 1.53 | 0.04 | 0.13 | ....do.... | Do. |
| 8 | 25.0 | 115   75 | 130 | DC/0.25 | 1.53 | 0.05 | 0.14 | ....do.... | Do. |
| Comparative Example No.: | | | | | | | | | |
| 1 | 42.1 | 115   75 | 130 | DC/0.2 | 0.81 | 0.05 | 0.20 | ....do.... | Do. |
| 2 | 24.5 | 115   75 | 130 | DC/0.3 | 0.76 | 1.50 | 0.58 | ....do.... | Faint yellow. |
| 3 | 24.5 | 105   70 | 120 | DC/0.2 | 0.90 | 1.20 | 0.33 | ....do.... | Do. |
| 4 | 24.5 | 115   75 | 130 | DB/0.2 | 1.26 | 0.69 | 1.20 | ....do.... | Do. |
| 5 | 24.5 | 115   75 | 130 | BB/0.2 | 0.74 | 0.72 | 1.26 | White | Do. |
| 6 | 24.5 | 115   75 | 130 | BPO/0.3 | 0.57 | 0.90 | 2.60 | ....do.... | Do. |
| 7 | 24.5 | 115   75 | 130 | {DC/0.1  BB/0.1} | 1.37 | 0.25 | 0.80 | Faint yellow | Yellow. |
| 8 | 24.5 | 115   75 | 130 | {BPO/0.1  DC/0.1} | 1.15 | 0.48 | 2.00 | White | Faint yellow. |

NOTE.—DC=dicumyl peroxide, DB=ditertiary butyl peroxide, BB=tertiary-butyl perbenzoate and BPO=benzoyl peroxide.

What is claimed is:

1. A process for the preparation of pure-white polystyrene compositions which comprises, (a) subjecting first to a bulk polymerization, at a temperature of from 80° C. to 120° C., a raw material mixture of from 85 to 98 parts by weight of styrene monomer and from 15 to 2 parts by weight of polybutadiene, until the conversion ratio of the styrene monomer reaches from about 20 to 40%, (b) dispersing the product from step (a) in an aqueous medium containing a dispersing agent selected from the group consisting of a vinyl acetate-dodecylvinyl ether copolymer in which the content of the dodecylvinyl ether component is 0.2 to 1.0 mole percent and the content of the vinyl acetate component is from 99 to 99.8 mole percent and the saponification value is above 80%, and a vinyl acetate-hexadecylvinyl ether copolymer in which the content of the hexadecylvinyl ether component is 0.2 to 1 mole percent and the content of the vinyl acetate component is 99 to 99.8 mole percent, and the saponification value is above 80%, dicumyl peroxide to the raw material mixture as a catalyst for the bulk polymerization reaction.

3. The process of claim 1 wherein the only polymerization catalyst present is dicumyl peroxide.

References Cited

UNITED STATES PATENTS

| 3,309,422 | 3/1967 | Doak et al. | 260—880 |
| 2,886,553 | 5/1959 | Stein et al. | 260—880 |
| 3,047,534 | 7/1962 | Dyer et al. | 260—880 |
| 3,284,542 | 11/1966 | Carrock et al. | 260—880 |
| 3,448,175 | 6/1969 | Doak et al. | 260—880 |

FOREIGN PATENTS

| 1,002,529 | 8/1965 | Great Britain | 260—880 |

JAMES A. SEIDLECK, Primary Examiner

U.S. Cl. X.R.

260—93.5